United States Patent [19]

Dudrey

[11] E Patent Number: Re. 32,381

[45] Reissued Date of Patent: Mar. 24, 1987

[54] CARTRIDGE CENTRIFUGE

[75] Inventor: Denis J. Dudrey, Minneapolis, Minn.

[73] Assignee: Donaldson Company, Inc., Minneapolis, Minn.

[21] Appl. No.: 302,402

[22] Filed: Sep. 15, 1981

Related U.S. Patent Documents

Reissue of:

[64] Patent No.: 3,858,793
Issued: Jan. 7, 1975
Appl. No.: 336,505
Filed: Feb. 28, 1973

U.S. Applications:

[63] Continuation of Ser. No. 2,388, Jan. 10, 1978.

[51] Int. Cl.[4] ..... B04B 1/06; B04B 1/12; B04B 15/06

[52] U.S. Cl. ..... 494/60; 494/43; 494/64; 494/78

[58] Field of Search ..... 494/44, 36, 2, 60, 56, 494/37, 27, 78; 210/360 R, 380 R

[56] References Cited

U.S. PATENT DOCUMENTS

| | | | |
|---|---|---|---|
| 1,129,178 | 2/1915 | D'Olier | 494/44 |
| 1,248,821 | 12/1917 | Curtis | 494/44 |
| 1,603,125 | 10/1926 | Lewis | 494/36 |
| 1,767,314 | 6/1936 | Schmitz . | |
| 1,956,496 | 4/1934 | Degerth . | |
| 2,067,273 | 1/1937 | Knowles et al. . | |
| 2,156,253 | 4/1939 | Clarke | 494/44 |
| 2,197,120 | 4/1940 | Bergmann | 494/36 |
| 3,235,174 | 2/1966 | Downey | 494/2 |
| 3,682,373 | 8/1972 | Mercier | 494/36 |

FOREIGN PATENT DOCUMENTS

| | | | |
|---|---|---|---|
| 519473 | 11/1953 | Belgium . | |
| 112205 | 9/1964 | Czechoslovakia . | |
| 73758 | 6/1894 | Fed. Rep. of Germany . | |
| 602483 | 6/1932 | Fed. Rep. of Germany | 494/36 |
| 908599 | 4/1952 | Fed. Rep. of Germany . | |
| 856129 | 11/1952 | Fed. Rep. of Germany | 494/44 |
| 1432838 | 12/1968 | Fed. Rep. of Germany | 494/2 |
| 2037366 | 7/1970 | Fed. Rep. of Germany . | |
| 1441 | 2/1963 | Japan . | |
| 369148 | 3/1932 | United Kingdom . | |
| 373885 | 6/1932 | United Kingdom . | |
| 1063246 | 3/1967 | United Kingdom . | |
| 1201833 | 8/1970 | United Kingdom . | |
| 335010 | 4/1972 | U.S.S.R. . | |

*Primary Examiner*—Robert W. Jenkins
*Attorney, Agent, or Firm*—Merchant, Gould, Smith, Edell, Welter & Schmidt

[57] ABSTRACT

The disclosure is directed to a cartridge type centrifuge for separating particulate matter from fluids. The cartridge comprises a plurality of flow stages, each of which consists of alternately wrapped layers of flat and corrugated paper defining a plurality of vertical passages, the corrugations determining the space between passages. To effect uniform flow throughout all vertical passages, which brings maximum particle separation efficiency, the centrifuge includes a unique baffle which causes all fluid to flow through an area of maximum angular momentum.

31 Claims, 5 Drawing Figures

CARTRIDGE CENTRIFUGE

Matter enclosed in heavy brackets [ ] appears in the original patent but forms no part of this reissue specification; matter printed in italics indicates the additions made by reissue.

*This is a continuation of application Ser. No. 2,388, filed Jan. 10, 1978.*

The invention is related to multiple passage centrifuges for separating particulate matter from fluid.

There are many different aspects which must be taken into consideration in accomplishing proper filtration of industrial liquids. Among these are the liquid flow rate within the system, the rate at which particulate matter is generated within the system and the degree of filtration. For example, an application in the metal working industry involving the coarse grinding of metal in conjunction with water base coolants requires filtration apparatus capable of handling high flows in an efficient manner. The degree of filtration, however is not great due to the size and coarseness of the particulate matter to be filtered. For more critical applications such as gear, form or thread grinding with oil coolants, the filtration apparatus must provide higher particle separation efficiency, but apparatus of this type ordinarily requires servicing more frequently because of the limited capacity of the filtering medium.

Many applications require an even higher degree of filtration and particle separation efficiency. For example, the removal of sub-micron particles from water or similar fluids used in test stands, plating solutions and filtration for reverse osmosis processes falls within this category. Even higher efficiencies are required for the separation of sub-micron particles from viscous oils used in hydraulic systems and gun drills.

The requirement for a high degree of filtration is not difficult where the quantity of particulate matter to be removed is small. Filter cartridges are particularly useful in such applications, and are commercially available over a broad range of micron ratings. However, where the need for fine filtration is coupled with a moderate to high generation of particulate matter in a given fluid system, the cost of filter cartridges becomes prohibitive.

This invention contemplates an improved centrifuge capable of economically separating increased quantities of extremely fine particulate matter from a fluid system at an extremely high separation efficiency. Because of its unique construction, the inventive centrifuge is particularly suited for use with a low cost, replaceable cartridge element, thus offering the additional advantage of low maintenance operation.

The structure of the inventive centrifuge is based on the principle that separation efficiency varies as a direct function of centrifugal force and particle settling area, but is uneffected by the depth of fluid stream moving therethrough. This principle is effectively utilized by providing within the centrifuge bowl a cartridge having a plurality of parallel passages having relatively little space therebetween. Thus, a settling surface many times greater than the cylindrical surface of the bowl is created.

Multiple bowl centrifuges are not themselves new. However, in order to realize the high separation efficiency potential of such devices, it is necessary to effect uniform flow over the entire settling area; i.e., through each bowl. Although the prior art has utilized many different structural arrangements for directing fluid flow through each bowl, none have been economically successful in accomplishing the uniform flow which results in high separation efficiency. The problem arises because the multiple bowls are disposed concentrically, and the annular passages defined therebetween have different effective radii. Rotation of each centrifuge bowl creates a forced vortex which holds the body of liquid in the annular area bounded by the bowl bottom, side wall and upper rim. However, the angular momentum of fluid disposed in the outer bowl passages is greater than that disposed in the inner bowl passages by reason of the increased radial distance from the vortex center. Because of these differences in angular momentum, incoming fluid to the centrifuge will pass only through the inner bowl passages and not through the outer passages. The result is nonuniform flow, and the advantage of increased settling area brought about by a plurality of bowls is lost.

This problem has been overcome in the improved centrifuge through the inclusion of means which forces all of the liquid passing through the plurality of passages to move through a point of maximum angular momentum before leaving the centrifuge. Since all of the liquid must achieve maximum angular momentum regardless of its path, there is no preference for the inner passages and uniform flow through the centrifuge is effected. Specifically, a unique baffle is disposed relative to the plurality of passages which causes all liquid to move in a controlled manner to the outer extremity of the rotating housing before continuing the flow path to the centrifuge outlet.

As pointed out above, this inventive structural arrangement enables the usage of a low cost, throw away cartridge, although the inventive concept is not so limited. The cartridge contemplated is itself structurally unique, being formed from alternately wrapped layers of flat and corrugated impervious material. The size of the corrugations or flutes determines the spacing between layers; and since separation efficiency is not affected by depth of the fluid, the finer the spacing the more efficient the cartridge. Because of its construction, the cartridge can be formed from heavy paper or cardboard which is treated to make it compatible with water and oil, as well as to provide rigidity. The use of a relatively low cost material of this type permits the cartridge to be replaced and thrown away at periodic intervals, which reduces the time needed for maintaining and servicing the unit.

Few industrial fluid systems requiring filtration generate particulate matter which is of the same size and shape. Consequently, effective filtration requires multiple staging of some type, and the unique cartridge construction described readily lends itself to such construction without departing from the advantages of multiple centrifuge bowls. Consequently, the preferred embodiments of the centrifuge cartridge element include a plurality of stages defining fluid passages which progressively decrease in size. Each stage is formed from alternately wrapped flat and corrugated paper as described above, and the plural stages are assembled as an integral unit.

The use of replaceable, multistage cartridges in a centrifuge separator utilizing the maximum angular momentum flow approach gives rise to a centrifuge separator which is capable of economically and efficiently removing a wide range of particulate matter from an industrial fluid system.

DESCRIPTION OF THE PREFERRED EMBODIMENT

Figure 1:
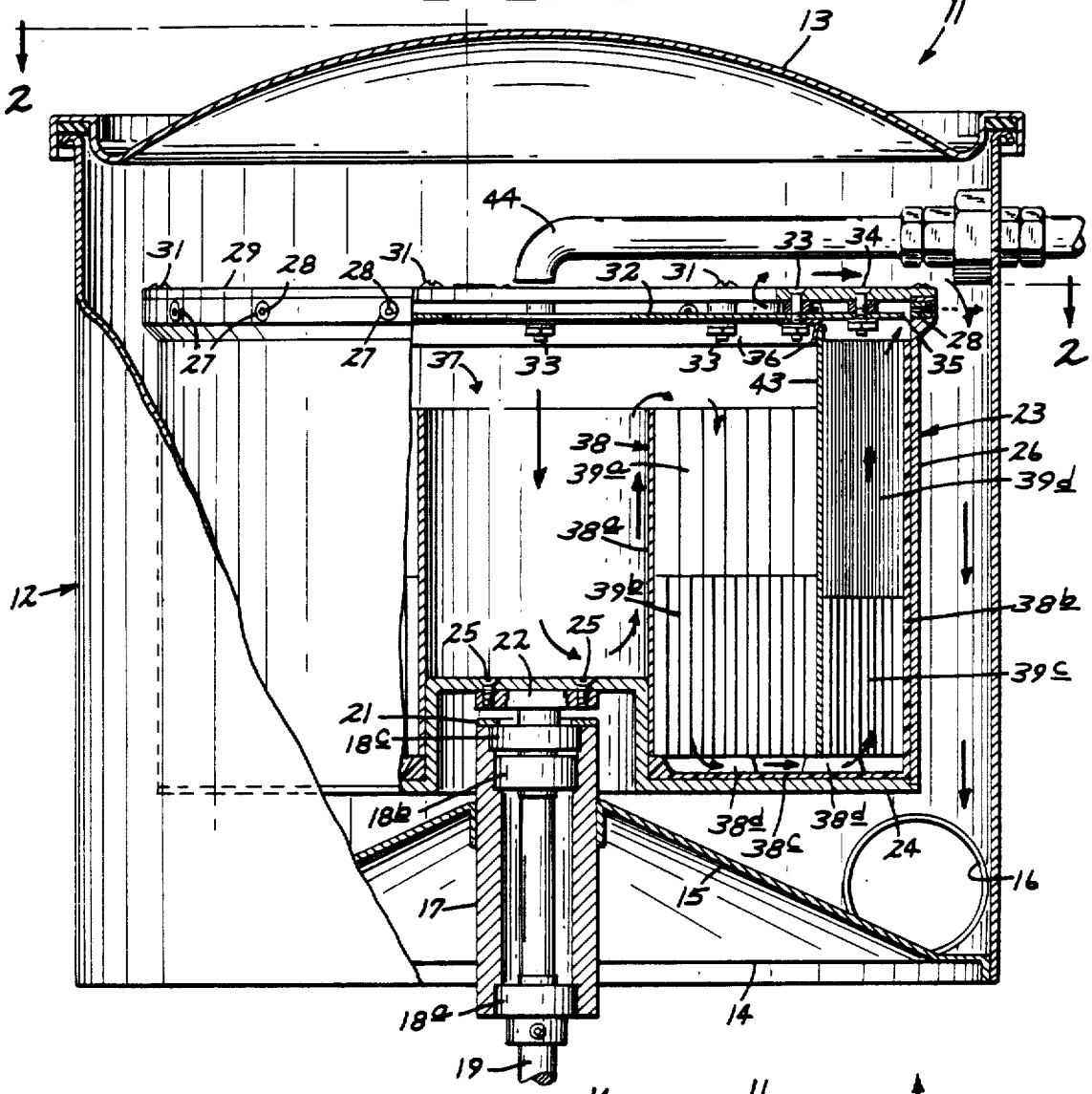
FIG. 1 is an elevational view of a centrifuge separator embodying the inventive principle, portions thereof being broken away and shown in section.
Figure 2:
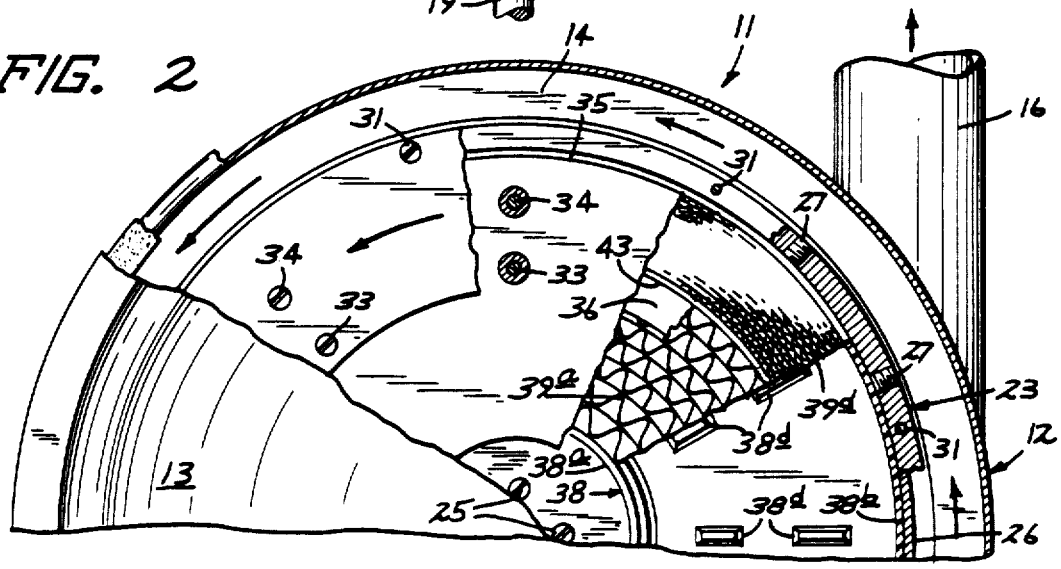
FIG. 2 is a fragmentary sectional view of a centrifuge separator taken along the line 2—2 of FIG. 1.

With initial reference to FIGS. 1 and 2, a centrifuge separator embodying the inventive principles is represented generally by the numeral 11. The centrifuge separator 11 has a two part, external stationary housing formed from an open topped cylindrical container 12 and a dome-shaped top 13 which fits over the upper edge of the container 12 and is frictionally retained. Container 12 has a bottom 14 the peripheral edge of which is sealed to the inner face of the container 12 to permit it to hold liquid without leaking. A conical member 15 is mounted on the bottom 14, its purpose being to direct the flow of liquid radially outward to a tangential outlet 16 projecting from the lower edge of container 12. Tangential outlet 16 makes use of the motion given the liquid by the rotating centrifuge, as will be evident below.

Bottom 14 and conical member 15 both have central openings which together receive and support a stationary sleeve 17. The inner surface of sleeve 17 is shaped to receive bearing members 18a, b which in turn support a rotatable shaft 19. Shaft 19 is rotated by means not shown. An upper seal 18c is retained vertically by an annular plate 21 which is secured to the upper end of sleeve 17.

The extreme upper end of shaft 19 terminates in a circular support plate 22, upon which a centrifuge separator 23 is mounted. Centrifuge 23 has a circular base plate 24 the central portion of which is recessed to fit over the support plate 22. A plurality of screws 25 secures base plate 24 to circular support plate 22 for rotation therewith. Centrifuge 23 further comprises a cylindrical side wall 26 the lower edge of which is secured to base plate 24. The upper peripheral edge for side wall 26 is thickened as shown, and is formed with a plurality of radial disposed threaded bores which respectively receive Allen screws 27. Each of the Allen screws 27 has a restrictive bore 28 formed therethrough which permits a limited flow of liquid as will be described below.

Centrifuge 23 further comprises a top 29 which takes the form of an annular plate and is removably secured to the upper edge of cylindrical side walls 26 by a plurality of screws 31. An annular baffle plate 32 is suspended from the top 29 by a first plurality of circularly arranged screw-spacer-nut sets 33 and a second plurality of similar sets 34 arranged in a slightly larger circle. The annular baffle plate 32 does not extend into engagement with the inner surface of cylindrical wall member 26, but rather defines with it a restrictive annular passage 35. As constructed, the passage 35 is disposed at the maximum radial point within centrifuge 23.

The inner screw-spacer-nut sets 33 also support an annular member 36 of essentially L-shaped cross section on the underside of annular baffle plate 32. As viewed in the cross sectional representation of FIG. 1, the legs of annular member 36 are disposed at a slightly acute angle for a purpose which will appear below.

From the foregoing, it will be apparent that removal of the screws 31 permits the top 29, baffle plate 32 and annular member 36 to be removed as a unit.

Centrifuge 23 further comprises a removable cartridge represented generally by the numeral 37. Cartridge 37 is defined by a liner tray 38 having an inner cylindrical wall 38a, and outer cylindrical wall 38b which is slightly higher than the wall 38a. A bottom 38c is integrally formed with outer wall 38b and engages wall 38a, although it is not secured thereto. Bottom 38c includes a plurality of spacers 38d which project upwardly a predetermined distance.

Disposed within the liner tray 38 are four particle separation stages designated 39a–d, respectively. Each of the separation stages 39a–d is constructed in accordance with the diagrammatic representation of FIG. 5, in which the cartridge element or separation stage is designated 39 generally. Cartridge element 39 consists of a flat layer 41 of liquid impervious material which is alternately wrapped with a corrugated layer 42 of the same material. Preferably, the material is heavy paper or flexible cardboard which is treated for compatibility with both water and oil and to provide rigidity as well. The size of the corrugations of the layer 42 determines the spacing between the layers 41, and thus defines the depth of liquid flow therethrough. To simplify construction the alternate layers 41, 42 are spirally wound from continuous lengths.

As shown in FIG. 1, the separation stages 39a–d have progressively smaller spacing between the layers 41 to accommodate particles of varying size and shape. Stages 39a, b are of the same overall cross sectional size and are disposed immediately adjacent the inner cylindrical wall 38a with stage 39a on top. Preferably, the stages 39a, b are secured to the wall member 38a for removal as a unit. Stage 39b rests on top of the spacers 38d to permit liquid to flow therefrom.

A liquid impervious cylindrical casing 43 is disposed between the stages 39a, b and 39c, d. As shown in FIG. 1, casing 43 extends vertically upward into sealing engagement with the annular member 36. As will now be appreciated, the acute angular leg formation of the member 36 permits a guided placement thereof relative to the casing 43 when the removable top assembly (top 29 and annular baffle 32) is replaced.

Stages 39c, d are disposed between the casing 43 and outer cylindrical wall 38b, and are preferably attached to the latter for removal as a unit.

As described, each of the separation stages 39a–d defines a plurality of concentric, annular, parallel passages (between flat layers 42) which act together as a multiple bowl centrifuge. *The passages in each separation stage have unrestricted inlets and outlets; i.e., the cross sectional area of the inlet and outlet of each passage is equal to or not less than the cross sectional area of the passage itself. As such, each passage defines a substantially uniform, nonrestricted flow path therethrough.*

It has been established that the liquid flow depth (i.e., the distance between layers 41) has no effect on particle separation efficiency. Consequently, the spacing between layers 41 is limited only by the size and shape of particulate matter which must be separated therein; hence, the progressively decreasing flow passage size from stage 39a to stage 39d. Because separation efficiency is a function of the area to which the filtered liquid can be exposed, it will also be appreciated that decreasing the spacial distance between layers 41 gives rise to an increased particle settling area or surface and greater particle separation efficiency.

As suggested above, the difficulty in prior art multiple bowl centrifuge separators has been in effecting uniform flow throughout each bowl. The problem has been caused by the formation of a forced vortex in each bowl, and the resulting differences in angular momentum of liquid within the vortex, since angular momentum is a direct function of radial distance from the vortex center. Where the flow through a bowl is limited to any extent, as it must be to permit separation, the liquid at the outer portion of the vortex has a greater angular momentum than that at the inner portion. Consequently, liquid entering from the center is unable to readily displace liquid at the outer bowl wall, with the result that the incoming liquid flows toward the outlet in a thin annulus at the inner portion of the vortex rather than penetrating the rotating body of liquid. In a multiple bowl centrifuge, this means that incoming liquid will pass through the bowl passages of lesser radius, and flow through the bowl passages of greater radius will occur very little if at all.

The centrifuge separator 11 overcomes this problem in its entirety by forcing all liquids to pass through a point of maximum angular momentum before leaving the outlet. Since all of the liquid must achieve maximum momentum, there is no preference for the inner passages. More specifically, in operation of the centrifuge separator 11, the liquid to be filtered enters the rotating centrifuge 23 from a spout 44 which is removably secured at an upper point to the cylindrical container 12. Spout 44 is constructed and arranged to deliver incoming liquid directly downward through the central openings in top 29 and annular baffle 32 into the central cup defined by base plate 24 and the inner cylindrical wall 38a of liner tray 38. As represented by the arrows in FIG. 1, the liquid moves radially outward and upward over the inner cylindrical wall 38a where it enters the first separation stage 39a. Further upward movement of the liquid is limited at this point by the baffle plate 32, which extends radially inward beyond the wall 38a. Movement of the liquid in the radially outward direction is prevented by the casing 43, which is sealably engaged by the annular member 36. Consequently, the liquid is diverted downward through the separation stages 39a and 39b, where particulate matter is separated from the liquid and settles on the outer passage walls. Upon leaving the stage 39b, the liquid passes radially outward through the spacers 38d and upward into the separation stages 39c and 39d. As the liquid leaves stage 39d, it is channeled toward the annular passage 35, *which lies radially outward of the outermost passage of separation stage 39d (FIG. 1), and* at which point [it] *the fluid* reaches maximum angular momentum. As pointed out above, since all liquid eventually reaches maximum angular momentum through the passage 35, there is no preference to the inner passage of any given particle separation stage; and liquid flow through all of the passages is therefore uniform. The result is maximum separation efficiency and filtration of particulate matter.

Upon movement through the passage 35, liquid moves radially inward between the baffle 32 and top 29 until reaching the innermost point of the top 29. The liquid then moves up and around the top 29, and thereafter downward between the centrifuge 23 and cylindrical container 12 until reaching the tangential outlet 16.

In order to stop the centrifuge 23 for servicing or cartridge replacement, liquid must first be drained from the bowl. It is therefore preferable to initially shut off the flow of liquid through the spout 44 while allowing the centrifuge 23 to continue running for a period of time. After the body of liquid is drained to a level corresponding to the inner peripheral edge of annular top 29, it can no longer flow through the main exit flow path described above. The remaining liquid drains through the orifices 28 until the centrifuge 23 is empty. A small amount of liquid escapes through orifices 28 during normal operation.

Figure 3:
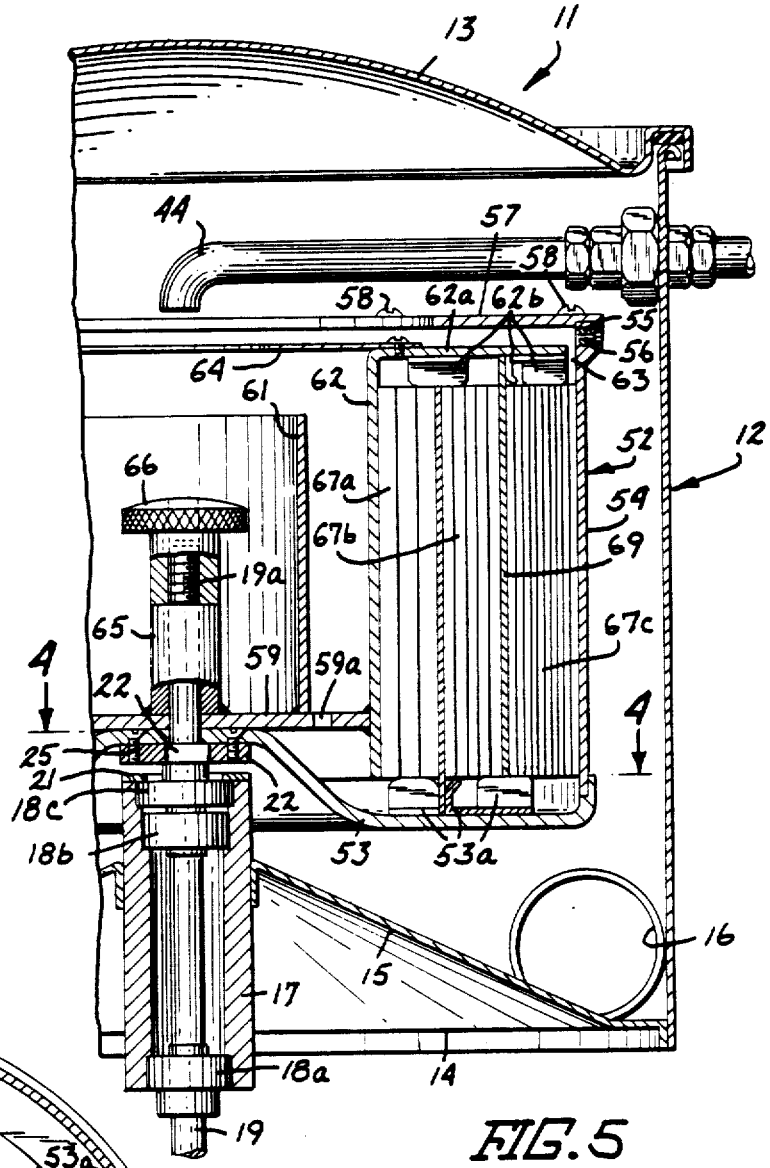
FIG. 3 is a fragmentary elevational view of an alternative centrifuge separator, portions thereof being broken away and shown in section.
Figure 4:
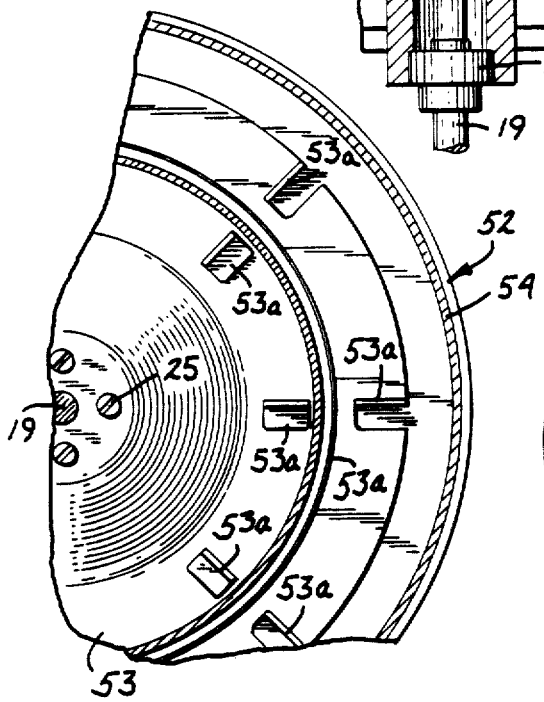
FIG. 4 is a fragmentary sectional view of the alternative centrifuge separator taken along the line 4—4 of FIG. 3.

FIGS. 3 and 4 set forth an alternative centrifuge separator represented generally by the numeral 51. Centrifuge separators 11, 51 are alike insofar that the rotatable bearing supports, external housing, inlet spout and outlet are concerned, and these components carry identical reference numerals.

Separator 51 includes a rotating centrifuge 52 having a base plate 53 secured to the circular support plate 22. A cylindrical container 54 defines the outer wall of centrifuge 52, and its upper peripheral edge is also thickened to receive radially disposed Allen screws 55 having orifices 56 bored therethrough. An annular top 57 is secured to the cylindrical container 54 by a plurality of screws 58.

Rotating shaft 19 projects upwardly beyond the support plate 22 in a threaded extension 19a. A circular plate 59 of reduced diameter has a central opening conforming in size to the threaded extention 19a and is disposed thereover in engagement with the base plate 53. Circular plate 59 has a set of circularly arranged openings 59a formed therethrough. An open topped cylindrical member 61 is concentric with the shaft 19 and has its lower edge secured to the circular plate 59.

A second cylindrical wall member 62 is affixed to the outer peripheral edge of circular plate 59. The lower edge of wall member 62 terminates at a point above base plate 53 corresponding to the top edge of a plurality of spacers 53a. The upper end of cylindrical wall member 62 forms a horizontal annulus 62a which terminates short of the cylindrical container 54 to define a passage 63 therewith. A plurality of spacers 62b are secured on the underside of annulus 62a. A thin annular plate 64 is screwed to the top of annulus 62a, projecting radially inward slightly beyond the cylindrical wall member 61.

As described, the circular plate 59 and its attendant structure is removable from the threaded extension 19a in the absence of top 57. To secure circular plate 59 to the base plate 53, a sleeve 65 is secured to the top surface of plate 59 to project axially upward. Operating in conjunction therewith is a threaded cap 66 which urges the removable assembly downwardly against the plate 53 upon tightening.

Figure 5:
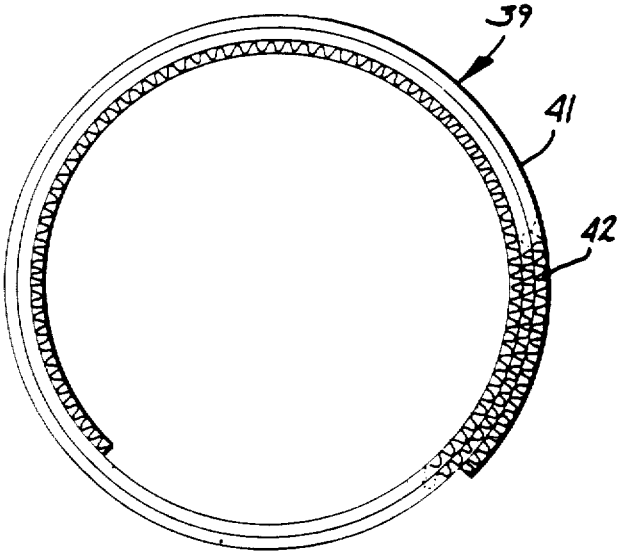
FIG. 5 is a plan view of a cartridge element usable in the inventive centrifuge separator.

Disposed within the spacers 53a and 62b are three particle separation stages 67a–c, which are constructed identically to the cartridge element 39 of FIG. 5. The spacial distance between flat layers 41 progressively increases in their respective stages 67a–c as in the centrifuge separator 11.

Disposed between separation stages 67a and 67b is a casing 68 which extends downwardly into sealing engagement with the base plate 53. As such, liquid communication is established between stages 67a and 67b only between the spacers 62b. Similarly, a casing 69 is disposed between separation stages 67b and 67c, extending upwardly into sealing engagement with the annulus 62a. As such, liquid communication between these two stages is through the spacers 53a only. The annular passage 63 communicates only with the separation stage 67c, *and is disposed at a radial distance from the center of the centrifuge which corresponds to that of the outermost passage of separation stage 67c.*

Operation of the centrifuge separator 51 is essentially the same as that of separator 11. Thus, liquid entering through the spout 44 is directed downwardly through the openings in top 57 an annular plate 64 into the cup defined by cylindrical wall member 61 and circular plate 59. The liquid then flows upwardly and over the wall member 61, where it is diverted downwardly by the annular plate 64 and cylindrical wall member 62. From this point, the liquid moves through openings 59a and under the all member 62, through the spacers 53 and upwardly through separation stage 67a.

From thence, the liquid moves through the spacers 62b, over the top of casing 68 and into separation stage 67b; and then through the spacers 53a, under casing 69 and into separation stage 67c. After passing through this final separation stage, the liquid achieves maximum angular momentum by passing through the annular passage 63. The exit path for the liquid beyond the passage 63 is otherwise the same as for centrifuge separator 11.

Disassembly of the centrifuge separator 51 for servicing and maintenance is accomplished by removal of the dome-shaped top 13 and spout 44. Screws 58 are thereafter removed to free the annular top 57, and threaded cap 66 is then unscrewed to permit removal of the assembly including circular plate 59, cylindrical wall member 61, 62 and annular plate 64. This exposes the separation stages 67a–c, permitting servicing or replacement as is deemed necessary.

To avoid improper liquid distribution and resulting vibration when the centrifuge is being drained, it may be desirable to include a number of small apertures through the flow passage walls of the separation stages, which cause the liquid to distribute properly. The term "fluid impervious" as used herein is therefore intended to accurately describe separation stage construction of this type as well, since the operating principle of the centrifuge separator is based on settling of particulate matter on the passage walls and not on filtration of particulate matter therethrough. Further, as used in this description, the term "concentric flow passages" is intended to cover separate annular passages and the like as well as the spiral passage of the preferred embodiment.

What is claimed is:

[1. Centrifuge apparatus for separating particulate matter from a fluid, comprising:

a. a stationary enclosure having fluid inlet means and outlet means;

b. a centrifuge mounted within the enclosure for rotation about a predetermined axis, the centrifuge defining a fluid receiving area disposed in communication with the inlet means to receive uncleaned fluid therefrom, and constructed to deliver cleaned fluid to the outlet means;

c. the centrifuge further comprising a plurality of passages disposed in essential alignment with said rotational axis at varying radial distances therefrom, the passages being in common inlet communication with said fluid receiving area;

d. and means associated with the centrifuge for receiving essentially all fluid passing through said passages and for causing said fluid to attain maximum angular momentum after leaving said plurality of passages, whereby uniform, parallel flow through said passages is effected.]

[2. Centrifuge apparatus for separating particulate matter from a fluid, comprising:

a. a stationary enclosure having fluid inlet means and outlet means;

b. a centrifuge mounted within the enclosure for rotation about a predetermined axis, the centrifuge defining a fluid receiving area disposed in communication with the inlet means to receive uncleaned fluid therefrom, and constructed to deliver cleaned fluid to the outlet means;

c. the centrifuge further comprising a plurality of essentially concentric passages of progressively increasing diameter and disposed in essential alignment with said rotational axis, the concentric passages being in common inlet communication with said fluid receiving area;

d. and baffle means defining a fluid outlet passage downstream of said essentially concentric passages and disposed to receive essentially all fluid passing through said concentric passages, said fluid outlet passage being disposed a radial distance from said rotational axis which is at least as great as that of the concentric passage of greatest diameter, whereby maximum angular momentum of the fluid is attained after the fluid leaves the concentric passages to effect uniform parallel flow therethrough.]

[3. The centrifuge apparatus defined by claim 2, wherein the essentially concentric passages are parallel with said rotational axis.]

[4. The centrifuge apparatus defined by claim 2, wherein said essentially concentric passages are defined by fluid impervious material.]

[5. The centrifuge apparatus defined by claim 2, wherein the receiving area is disposed centrally of the centrifuge.]

[6. The centrifuge apparatus defined by claim 2, wherein the centrifuge comprises a fluid container having a cylindrical side wall, and said fluid outlet passage is annular in shape.]

[7. The centrifuge apparatus defined by claim 6, wherein the baffle means comprises an essentially circular plate of lesser diameter than the diameter of the cylindrical side wall, said annular fluid outlet passage being defined between the peripheral edge of the circular plate and the inner surface of the cylindrical side wall.]

[8. The centrifuge apparatus defined by claim 7, wherein said circular plate is essentially annular, defining a central opening through which uncleaned fluid can flow to the fluid receiving area, said circular plate being disposed in overlying relation to the concentric flow passages and spaced therefrom to guide fluid relative thereto.]

[9. The centrifuge apparatus defined by claim 8, which further comprises a second annular plate extending radially inward from the upper edge of said cylindrical side wall and spaced above the first named annular plate to define a flow path therewith, the second annular plate having an inner diameter greater than that of said first annular plate.]

[10. The centrifuge apparatus defined by claim 9, wherein the upper peripheral edge of the cylindrical side wall has a plurality of restrictive orifices formed therethrough, said orifices being disposed downstream of said annular fluid outlet passage.]

[11. The centrifuge apparatus defined by claim 2, wherein the centrifuge defines a plurality of sequentially disposed separation stages, each stage comprising a plurality of essentially concentric passages of progressively increasing diameter disposed in essential alignment with the rotational axis the concentric passages of the first separation stage being in common inlet communication with the fluid receiving area, and the concentric passages of the last separation stage being in common outlet communication with said fluid outlet passage.]

[12. The centrifuge apparatus defined by claim 11, wherein the concentric passages in each stage are of essentially the same size.]

[13. The centrifuge apparatus defined by claim 12, wherein the concentric flow passages are of progressively decreasing size from stage to stage.]

[14. The centrifuge apparatus defined by claim 13, wherein the outermost passage of at least one stage has a lesser diameter than the innermost passage of at least one other stage, and further comprising means for guiding fluid flow from said one stage to said other stage.]

[15. The centrifuge apparatus defined by claim 14, wherein the guiding means causes the fluid to reverse its flow direction as it leaves said one stage and enters said other stage.]

[16. The centrifuge apparatus defined by claim 11, wherein each of said plurality of stages is annular in shape, and the receiving area comprises a central receiving cup defined by at least one of said stages.]

[17. The centrifuge apparatus defined by claim 16, wherein the fluid inlet means comprises a spout adapted for connection with a source of uncleaned fluid, said spout being constructed and arranged to deliver incoming fluid downwardly into said central receiving cup.]

[18. The centrifuge apparatus defined by claim 2, wherein the stationary enclosure comprises an open topped cylindrical container and a removable top therefor, the centrifuge being rotatably disposed within the cylindrical container.]

[19. The centrifuge apparatus defined by claim 2, wherein the centrifuge further comprises removable cartridge means for defining said plurality of concentric passages.]

[20. Centrifuge apparatus for separating particulate matter from a fluid, comprising:

a. a stationary enclosure having fluid inlet means and outlet means;

b. a centrifuge mounted within the enclosure for rotation about a predetermined axis, the centrifuge constructed to receive uncleaned fluid from the inlet means and to deliver cleaned fluid to the outlet means, comprising 1. an upright fluid container defined an essentially cylindrical side wall and a bottom;

2. a first annular plate extending radially inward a predetermined sitance from the upper edge of the cylindrical side wall;

3. a second annular plate mounted in spaced relation below the first annular plate to define a flow path therewith, the inner diameter of the second annular plate being less than the inner diameter of the first annular plate, and the outer diameter of the second annular plate being less than that of the cylindrical side wall to define therewith an annular fluid outlet passage for the container;

4. and replaceable cartridge means removably disposed in the fluid container below the second annular plate and defining a fluid receiving area therewith which communicates with the inlet means;

5. said cartridge means defining at least one separation stage comprising a plurality of essentially concentric passages of progressively increasing diameter and extending essentially parallel with said rotational axis, said concentric passages being in common inlet communication with the fluid receiving area and in outlet communication with said annular fluid outlet passage.]

[21. The centrifuge apparatus defined by claim 20, wherein said cartridge means defines a plurality of sequentially disposed separation stages each of which comprises a plurality of essentially concentric passages of progressively increasing diameter and essentially constant radial depth, the concentric passages of the first separation stage being in common inlet communication with the fluid receiving area, and the concentric passages of the last separation stage being in common outlet communication with said fluid outlet passage.]

[22. The centrifuge apparatus defined by claim 21, wherein the concentric flow passages are of progressively decreasing radial depth from stage to stage.]

[23. The centrifuge apparatus defined by claim 22, wherein each of said separation stages is annular in shape, with at least one stage disposed in an axially stacked relationship with at least one other stage.]

[24. The centrifuge apparatus defined by claim 23, wherein:

a. each of said separation stages is annular in shape, with at least one stage encircling one other stage;

b. and further comprising means for reversibly guiding the flow of fluid from said one stage to said other stage.]

[25. A replaceable cartridge for centrifuge apparatus capable of separating particulate matter from a fluid, comprising:

a. a plurality of separation stages, each of which comprises i. an essentially flat layer of flexible material essentially impervious to fluid;

ii. and a corrugated layer of flexible material essentially impervious to fluid;

iii. said flat and corrugated layers being wrapped in alternating fashion about a central axis to define a plurality of essentially concentric fluid flow passages of equivalent flow depth;

b. the fluid flow passages of the respective separation stages being of different flow depth;

c. and means for holding said plurality of separation stages for sequential fluid flow in order of decreasing flow depth.]

[26. The replaceable cartridge defined by claim 25, wherein said flat and corrugated layers are spirally wound about said central axis.]

[27. The cartridge defined by claim 25, wherein at least one separation stage is disposed in an axially stacked relationship with at least one other stage.]

[28. The cartridge defined by claim 25, which further comprises a liner tray comprising a. inner and outer cylindrical walls interconnected by a tray bottom;

b. the separation stages being concentrically disposed within said liner tray;

c. and means for spacing the separation stages from the tray bottom to prevent fluid flow therebetween.]

[29. The cartridge defined by claim 28, wherein the separation stages are arranged in first and second pairs, the stages of each pair being disposed in an axially stacked relation, the second pair of stages encircling the first pair.]

[30. The cartridge defined by claim 29 which further comprises a fluid impervious cylindrical casing disposed between the first and second pairs of separation stages.]

[31. The cartridge defined by claim 28, wherein at least one separation stage is disposed in encircling relation to at least one other stage, and further comprising a fluid impervious cylindrical casing disposed between the encircling stage and the encircled stage.]

[32. The cartridge defined by claim 25, wherein at least one stage is disposed in encircling relation to at least one other stage.]

[33. The cartridge defined by claim 32, which further comprises a fluid impervious cylindrical casing disposed between the encircling stage and the encircled stage.]

*34. Centrifuge apparatus for separating particulate matter from a fluid comprising:*

*(a) a stationary enclosure having fluid inlet means and outlet means;*

*(b) a centrifuge mounted within the enclosure for rotation about a predetermined axis, the centrifuge comprising a plurality of separate flow passages each defining a substantially uniform, nonrestricted flow path therethrough, the separate flow passages being disposed in essential alignment with said rotational axis at varying radial distances therefrom;*

*(c) the centrifuge further defining central fluid receiving and distributing means disposed in communication with the inlet means for receiving uncleaned fluid therefrom and disposed in common inlet communication with said passages for distributing said uncleaned fluid radially outward and directly into said passages during said outward movement for parallel flow therethrough;*

*(d) and baffle means defining a fluid outlet passage downstream of said separate flow passages and disposed to receive substantially all fluid passing through said passages, said fluid outlet passage being disposed a radial distance from said rotational axis which is greater than that of the passage of greatest diameter to cause said fluid to attain an angular momentum that is greater than the fluid angular momentum at any upstream point within the centrifuge to effect uniform, parallel flow through said passages.*

*35. The centrifuge apparatus defined by claim 34, wherein the essentially concentric passages are parallel with said rotational axis.*

*36. The centrifuge apparatus defined by claim 34, wherein said essentially concentric passages are defined by fluid impervious material.*

*37. The centrifuge apparatus defined by claim 34, wherein the centrifuge comprises a fluid container having a cylindrical side wall, and said fluid outlet passage is annular in shape.*

*38. The centrifuge apparatus defined by claim 37, wherein the baffle means comprises an essentially circular plate of lesser diameter than the diameter of the cylindrical side wall, said annular fluid outlet passage being defined between the peripheral edge of the circular plate and the inner surface of the cylindrical side wall.*

*39. The centrifuge apparatus defined by claim 38, wherein said circular plate is essentially annular, defining a central opening through which uncleaned fluid can flow to the fluid receiving area, said circular plate being disposed in overlying relation to the concentric flow passages and spaced therefrom to guide fluid relative thereto.*

*40. The centrifuge apparatus defined by claim 39, which further comprises a second annular plate extending radially inward from the upper edge of said cylindrical side wall and spaced above the first named annular plate to define a flow path therewith, the second annular plate having an inner diameter greater than that of said first annular plate.*

*41. The centrifuge apparatus defined by claim 40, wherein the upper peripheral edge of the cylindrical side wall has a plurality of restrictive orifices formed therethrough, said orifices being disposed downstream of said annular fluid outlet passage.*

*42. The centrifuge apparatus defined by claim 34, wherein the centrifuge defines a plurality of sequentially disposed separation stages, each stage comprising a plurality of essentially concentric passages of progressively increasing diameter disposed in essential alignment with the rotational axis the concentric passages of the first separation stage being in common inlet communication with the fluid receiving area, and the concentric passages of the last separation stage being in common outlet communication with said fluid outlet passage.*

*43. The centrifuge apparatus defined by claim 42, wherein the concentric passages in each stage are of essentially the same size.*

*44. The centrifuge apparatus defined by claim 43, wherein the concentric flow passages are of progressively decreasing size from stage to stage.*

*45. The centrifuge apparatus defined by claim 44, wherein the outermost passage of at least one stage has a lesser diameter than the innermost passage of at least one other stage, and further comprising means for guiding fluid flow from said one stage to said other stage.*

*46. The centrifuge apparatus defined by claim 45, wherein the guiding means causes the fluid to reverse its flow direction as it leaves said one stage and enters said other stage.*

*47. The centrifuge apparatus defined by claim 42, wherein each of said plurality of stages is annular in shape, and the receiving area comprises a central receiving cup defined by at least one of said stages.*

*48. The centrifuge apparatus defined by claim 47, wherein the fluid inlet means comprises a spout adapted for connection with a source of uncleaned fluid, said spout being constructed and arranged to deliver incoming fluid downwardly into said central receiving cup.*

*49. The centrifuge apparatus defined by claim 34, wherein the stationary enclosure comprises an open topped cylindrical container and a removable top therefor, the centrifuge being rotatably disposed within the cylindrical container.*

*50. The centrifuge apparatus defined by claim 34, wherein the centrifuge further comprises removable cartridge means for defining said plurality of concentric passages.*

*51. Centrifuge apparatus for separating particulate matter from a fluid comprising:*

(a) a stationary enclosure having fluid inlet means and outlet means;

(b) a centrifuge mounted within the enclosure for rotation about a predetermined axis, the centrifuge constructed to receive uncleaned fluid from the inlet means and to deliver cleaned fluid to the outlet means, comprising (1) an upright fluid container defined by an essentially cylindrical side wall and a bottom;

(2) a first annular plate extending radially inward a predetermined distance from the upper edge of the cylindrical side wall;

(3) a second annular plate mounted in spaced relation below the first annular plate to define a flow path therewith, the inner diameter of the second annular plate being less than the inner diameter of the first annular plate, and the outer diameter of the second annular plate being less than that of the cylindrical side wall to define therewith an annular fluid outlet passage for the container;

(4) and replaceable cartridge means removably disposed in the fluid container below said second annular plate, the cartridge means defining at least one separation stage comprising a plurality of substantially concentric separate flow passages each defining a substantially uniform, nonrestricted flow path therethrough, the passages extending substantially parallel with said rotational axis;

(5) the cartridge means further comprising central fluid receiving and distributing means disposed in communication with the inlet means for receiving uncleaned fluid therefrom, and disposed in common inlet communication with said passages for distributing said uncleaned fluid radially outward and directly into said passages during said outward movement for parallel flow therethrough;

(6) said annular fluid outlet passage being disposed in common outlet communication with said concentric passages and disposed a radial distance from said rotational axis which is greater than that of any of the concentric passages to cause the fluid to attain an angular momentum that is greater than the fluid angular momentum at any upstream point within the centrifuge to effect uniform parallel flow through the concentric passages.

52. The centrifuge apparatus defined by claim 51, wherein said cartridge means defines a plurality of sequentially disposed separation stages each of which comprises a plurality of essentially concentric passages of progressively increasing diameter and essentially constant radial depth, the concentric passages of the first separation stage being in common inlet communication with the fluid receiving area, and the concentric passages of the last separation stage being in common outlet communication with said fluid outlet passage.

53. The centrifuge apparatus defined by claim 52, wherein the concentric flow passages are of progressively decreasing radial depth from stage to stage.

54. The centrifuge apparatus defined by claim 53, wherein each of said separation stages is annular in shape with at least one stage disposed in an axially stacked relationship with at least one other stage.

55. The centrifuge apparatus defined by claim 54, wherein:

(a) each of said separation stages is annular in shape, with at least one stage encircling one other stage;

(b) and further comprising means for reversibly guiding the flow of fluid from said one stage to said other stage.

56. The centrifuge apparatus defined by claim 51, wherein each of said separation stages comprises:

(a) an essentially flat layer of flexible material essentially impervious to fluid;

(b) and a corrugated layer of flexible material essentially impervious to fluid;

(c) said flat and corrugated layers being wrapped in alternating fashion about a central axis so that said fluid flow passages are substantially concentric and are of equivalent flow depth.

57. The centrifuge apparatus defined by claim 56, wherein said flat and corrugated layers are spirally wound about said central axis.

58. The centrifuge apparatus defined by claim 56, which further comprises a liner tray comprising:

(a) inner and outer cylindrical walls interconnected by a tray bottom;

(b) the separation stages being concentrically disposed within said liner tray;

(c) and means for spacing the separation stages from the tray bottom to prevent fluid flow therebetween.

59. The centrifuge apparatus defined by claim 58, wherein the separation stages are arranged in first and second pairs, the stages of each pair being disposed in an axially stacked relation, the second pair of stages encircling the first pair.

60. The centrifuge apparatus defined by claim 59, which further comprises a fluid impervious cylindrical casing disposed between the first and second pairs of separation stages.

61. The centrifuge apparatus defined by claim 58, wherein at least one separation stage is disposed in encircling relation to at least one other stage, and further comprising a fluid impervious cylindrical casing disposed between the encircling stage and the encircled stage.

62. The centrifuge apparatus defined by claim 56, wherein at least one stage is disposed in encircling relation to at least one other stage.

63. The centrifuge apparatus defined by claim 62, which further comprises a fluid impervious cylindrical casing disposed between the encircling stage and the encircled stage.

64. Centrifuge apparatus for separating particulate matter from a fluid comprising:

(a) a stationary enclosure having fluid inlet means and outlet means;

(b) a centrifuge mounted within the enclosure for rotation about a predetermined axis, the centrifuge comprising a plurality of separate flow passages each defining a substantially uniform, nonrestricted flow path therethrough, the separate flow passages being disposed in essential alignment with said rotational axis at varying radial distances therefrom;

(c) the centrifuge further defining central fluid receiving and distributing means disposed in communication with the inlet means for receiving uncleaned fluid therefrom and disposed in common inlet communication with said passages for distributing said uncleaned fluid radially outward and directly into said passages during said outward movement for parallel flow therethrough;

(d) and means associated with the centrifuge and disposed downstream of said passages for receiving substantially all fluid passing through said passages and for causing said fluid to attain an angular momentum that is greater than the fluid angular momentum at any upstream point within the centrifuge whereby uniform, parallel flow through said passages is effected.

* * * * *